United States Patent [19]

Langenstein

[11] Patent Number: 4,768,258
[45] Date of Patent: Sep. 6, 1988

[54] HANDLE EXTENSION FOR A MANUAL IMPLEMENT SUCH AS A GARDENING, CLEANING OR LIKE TOOL

[75] Inventor: Max Langenstein, Illertissen, Fed. Rep. of Germany

[73] Assignee: Max Langenstein Feld- und Gartengerate GmbH & Co., Illertissen, Fed. Rep. of Germany

[21] Appl. No.: 82,844

[22] Filed: Aug. 6, 1987

[30] Foreign Application Priority Data

Aug. 18, 1986 [DE] Fed. Rep. of Germany ....... 3628004

[51] Int. Cl.$^4$ ............................................. B25G 1/04
[52] U.S. Cl. ...................................... 16/115; 403/348
[58] Field of Search .......... 16/115; 15/743 A, 143 B, 15/144 R, 144 A, 144 B; 403/314, 348, 350

[56] References Cited

U.S. PATENT DOCUMENTS 2,841,425  7/1958  Oeters .................................. 16/115
4,524,484  6/1985  Graham ............................ 15/144 B Primary Examiner—M. Jordan
Attorney, Agent, or Firm—Herbert Dubno

[57] ABSTRACT

A connecting ring which is screwed with a collar in a passage of a tool handle provides a connection of the tool handle with an extension. The edge of the collar is provided with locking teeth and the interior wall of the tool handle in the passage is provided with locking projections. On screwing in the collar in the passage of the tool handle the locking teeth come into engagement with the locking projections to form a locking seat for the collar in the tool handle by motion in the circumferential direction around the tool handle. This secures the screw connection from undesired loosening. In the same way as the connecting ring can be secured to the tool handle also the cap closing the passage can be secured in a locking seat when the extension is removed from the handle and is not used.

9 Claims, 2 Drawing Sheets

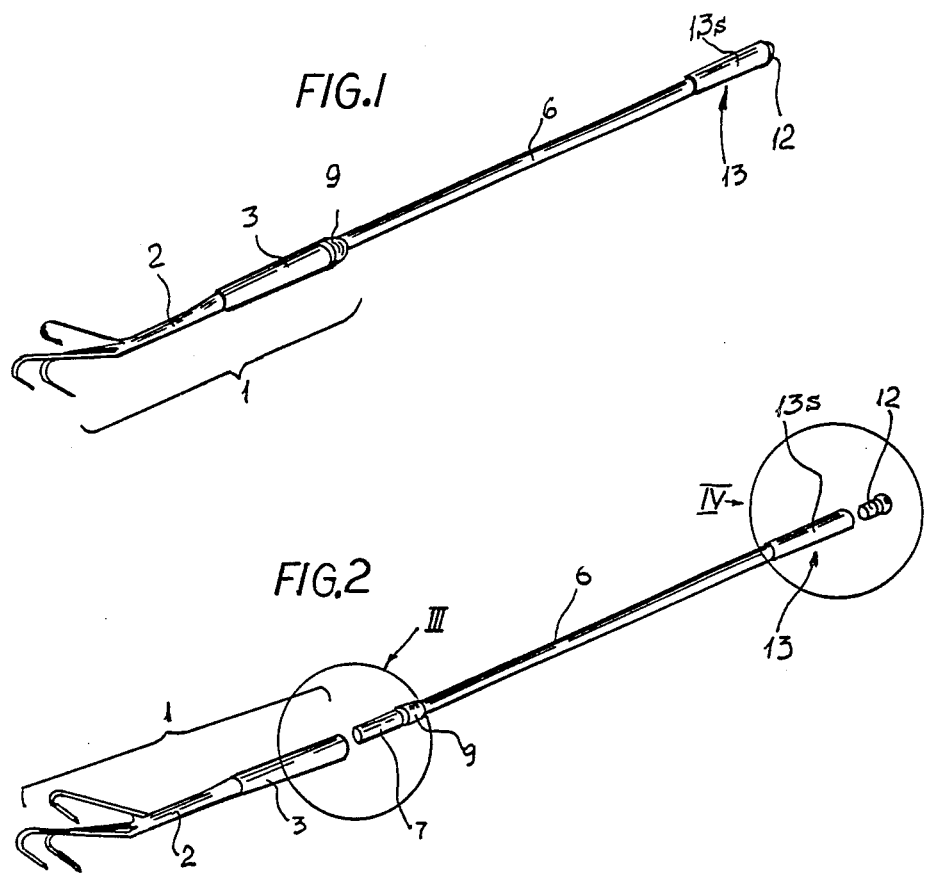
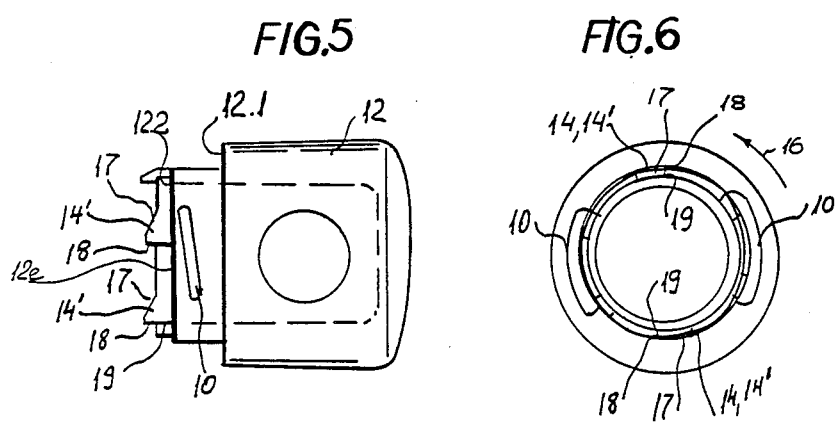

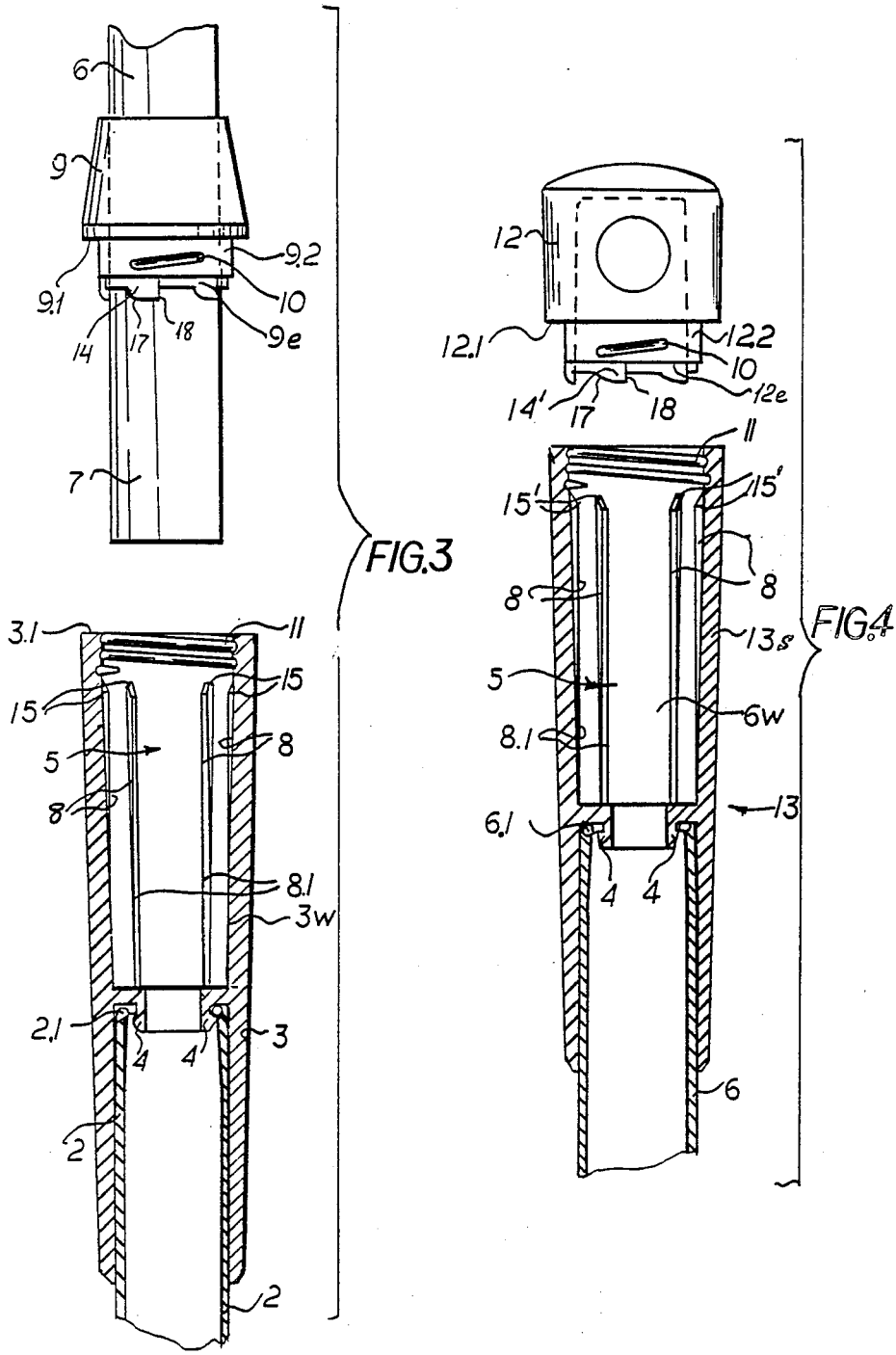

HANDLE EXTENSION FOR A MANUAL IMPLEMENT SUCH AS A GARDENING, CLEANING OR LIKE TOOL

FIELD OF THE INVENTION

My present invention relates to an implement such as a gardening tool, cleaning tool or the like and, more particularly, an implement of the type which comprises a tool handle and an extension insertable slidably and rotatably in a passage of the tool handle, and wherein the extension has a connecting ring which has a collar protruding into the tool handle and engaging the wall of the tool handle in a releasable screw connection.

BACKGROUND OF THE INVENTION

Such an implement has been described in Austrian Patent 358 310 and can either be manipulated directly with its tool handle or indirectly with the extension holding the tool handle by the connecting ring.

The extension has a cap on its free end which has a collar protruding into the extension like the connecting ring. The collar is connected with the end of the extension it is engaged in in the same way as the connecting ring with the end of the tool handle.

When the implement is used without the extension, the tool handle can be closed with the cap taken from the extension to prevent dirt from collecting in the tool handle. This implement which has been in use for years has the disadvantage that the screw connection between the connecting ring and/or the cap on the one hand and the tool handle on the other hand can loosen. This is troublesome when working with the extension since the connecting ring must always be retightened to the tool handle or on working without the extension since there is a danger of loss of the cap.

OBJECTS OF THE INVENTION

It is an object of my invention to provide an improved implement such as a gardening tool, cleaning tool and the like which will obviate the aforementioned drawbacks.

It is also an object of my invention to provide an improved implement such as a gardening tool, cleaning tool and the like having an extension connectable to the tool by a screw connection and a cap connectable by a screw connection to either the extension or the tool in which unintended loosening of a connecting ring and/or the cap from either the tool handle or the extension is prevented.

SUMMARY OF THE INVENTION

These objects and others which will become more readily apparent hereinafter are attained in accordance with my invention in a implement such as a gardening tool, cleaning tool or the like including a tool handle and an extension insertable slidably and rotatably fitting in a passage of the tool handle. The extension carries a connecting ring which has a collar insertable into the tool handle and engagable with the wall of the tool handle in a manually rotationally releasable screw connection.

According to my invention an edge of the collar is provided with a plurality of locking teeth and a wall of the tool handle has a plurality of locking projections inside the passage and on screwing in the collar in the passage the locking teeth and the locking projections come into locking engagement with each other by motion in the circumferential direction about the tool handle so that the collar attains a locking seat in the tool handle.

My invention is an implement in which the extension carries a cap at its free end which like the connecting ring of the extension has a collar insertable into the extension which is attached with a steel sleeve of the extension like the connecting ring of the extension with the end of the tool handle.

Thus the objects in regard to the cap are attained since an edge of the other collar on the cap is provided with another plurality of locking teeth and the interior wall of the extension is provided with another plurality of locking projections and on screwing in the other collar in the extension the locking teeth and the locking projections come into a locking engagement by motion in the circumferential direction of the extension forming a locking seat of the other collar on the extension.

Advantageously the collars and the locking teeth on the connecting ring and the cap can be substantially identical equal so that the cap attains a locking engagement with the locking projections in the same way as the connecting ring of the extension on screwing in the tool handle.

As a result, with my invention, the connecting ring and/or the cap are secure from undesirable loosening or detachment in their screwed on state on the tool handle by the locking engagement between the locking teeth and the locking projections.

However the screw connection between the tool handle on one hand and the connecting ring and/or the cap on the other hand can be loosened simply by unscrewing the cap or connecting ring overcoming the locking engagement between the locking teeth and the locking projection by an appropriately large applied torque.

In an advantageous embodiment of my invention, the sides of the locking teeth which are leading are inclined more gently than the sides of the locking teeth trailing them in the direction of rotation corresponding to screwing in the collar.

According to an additional feature of my invention the locking teeth like the collars run arcuately about the collar axes and a radially projecting piece is provided on the outer circumferential surface of the tooth row on each of the sides of the locking teeth trailing in the direction of rotation of the collar corresponding to screwing in the collar. The sides of the locking teeth and the projecting piece are substantially axially directed and aligned with each other.

The projecting piece in the same way as the sides of the locking teeth trailing in the direction of rotation corresponding to screwing the collar in permits securing the collar on the locking projections against unintended loosening or unscrewing. The locking engagement of the locking teeth on the locking projections can occur in this way both axially and radially.

In particular the radial engagement allows in a particularly simple way an elastic deformation of the locking teeth on passing the locking projections until the locking teeth snap into a locking seat behind the locking projections they just passed. Here the locking projections should extend increasingly radially into the passage in the direction the collar advances into the passage as it is screwed in and attain their full radial height axially over a distance which corresponds substantially to the axial height of the locking teeth. Hence the radial and also the axial lock in depth of the locking teeth on the locking projections is correspondingly larger than the insertion depth of the connecting ring and/or of the cap in the tool handle.

A plurality of ribs on the interior wall of the tool handle can extend axially into the passage forming a guide for the extension in the passage. Advantageously in this embodiment the ends of the ribs can form the locking projections. Furthermore the spacing of the locking teeth following each other in the circumferentially direction of the collar can be equal to the circumferential spacing of the ribs. Because of that all the locking teeth come into locking engagement simultaneously behind the locking projections associated with them and result in a especially reliable locking seat.

BRIEF DESCRIPTION OF THE DRAWING

The above and other objects, features and advantages of my invention will become more readily apparent from the following description, reference being made to the accompanying highly diagrammatic drawing in which:

FIG. 1 is a perspective view of an inclined gardening tool according to my invention;

FIG. 2 is a perspective, partially exploded view of the gardening tool of FIG.1;

FIG. 3 is a magnified partially side elevational, partially side cross sectional view of that part of the gardening tool indicated at III in FIG. 2;

FIG. 4 is an enlarged partially side elevational, partially side cross sectional view of that part of the gardening tool indicated at IV in FIG. 2;

FIG. 5 is a side elevational view of a cap for the tool of FIGS. 1 to 4 rotated through 90° relative to FIG. 4, and FIG. 6 is a front view of the connecting ring and/or the cap of the tool of FIGS. 1 to 4 showing the edge of the collar.

DESCRIPTION OF THE PREFERRED EMBODIMENT

In the gardening tool illustrated in the drawing the working portion is indicated with 1 and includes a tool portion 2 attached to a tool handle 3.

The tool handle 3 comprises a plastic sleeve on which the tool portion 2 made of light metal is mounted.

The edge 2.1 of the tool portion 2 can be flanged toward its interior and can engage behind a circular lip 4 of the tool handle 3 so that the tool portion 2 is secured in the tool handle 3.

A passage 5 is located in the portion of the tool handle 3 not immediately engaged with the tool portion 2 in which an extension 6 can be inserted which in this embodiment is formed like a light metal pipe.

The extension has a steel shaft 7 with which it fits in the passage 5 of the tool handle 3 and is guided rotatable and longitudinally slidable in it. Whereas the steel shaft 7 is cylindrical in this embodiment, the tool handle 3 itself is widened gently conically in the direction of the extension 6 and ribs 8 are located on the inner wall 3w of the tool handle 3 in the vicinity of the passage 5 so that the ribs 8 form a guide for the steel shaft 7.

The extension 6 carries exteriorly a nonslidable connecting ring 9 which is made of plastic in this embodiment and sits nonrotatably and nonslidably on the extension 6. The connecting ring 9 contacts with a collar 9.1 on the end of the tool handle 3 on the front edge 3.1 of the tool handle 3. The connecting ring 9 has another collar 9.2 protruding into the tool handle 3 with which the connecting ring 9 is releasably connected to the wall 3w of the tool handle 3.

Moreover the collar 9.2 has inclined strips 10 on its outside forming a screw thread of sorts which engages with a groove 11 on the wall 3w of the handle 3 which opens onto the edge 3.1 of the handle 3 and runs from there like the threads of a screw on the interior side of the handle wall 3w inclined interiorly in the direction of the tool piece 2. In the embodiment illustrated two grooves running in the same rotational direction are provided which form as it were a twin thread with each thread running over only a single circumferential rotation. Both grooves 11 are offset in the rotational direction corresponding to the two inclined strips 10 so that on axial insertion of the extension 6 into the passage 5 of the tool handle 3 the strips 10 in this embodiment sitting diametrically opposite each other on the connection ring 9 can be put in both grooves 11.

By rotation of the extension 6 the connecting ring 9 screws in the tool handle 3 until its collar 9.1 contacts on the handle edge 3.1 whereby a rigid connection between the tool handle 3 and the extension 6 is attained.

The extension 6 carries a cap 12 on its free end which like the connecting ring 9 has a collar 12.1 contacting on the end of the extension and another collar 12.2 projecting or protruding into the extension 6 which is connected in the same way with the extension end 13 as the connecting ring 9 is with the end of the tool handle 3. It also has inclined strips 10 similar to those provided on the connecting ring 9.

To be able to connect the cap 12 in the same way as the connector ring 9 on the tool handle 3 in this embodiment the extension 6 carries a steel sleeve 13s on its free end (the end opposite the tool carrying end) which is formed exactly like the tool handle 3 and is rigidly attached to the end of the extension 6.

It is also possible to close the tool handle 3 by the cap 12 when only the working portion 1 without the extension 6 is to be used. For connection of the extension 6 it is only required that the cap 12 be taken from the tool handle 3 and put on the extension handle 13s and that the extension 6 be put rn the tool handle 3 in the way already described.

To guarantee that unintended loosening of the connecting ring 9 from the tool handle 3 is prevented, the edge 9e of the collar 9.2 of the connecting ring 9 is provided with locking teeth 14 and the interior wall 3w of the tool handle 3 is provided with locking projections 15. On screwing the collar 9.2 into the passage 5 the locking teeth 14 and the locking projections 15 engage with each other by motion in the circumferential direction and lock in a locking seat of the collar 9.2.

To secure the cap 12 against unintended loosening also the free edge 12e of the collar 12.2 of the cap 12 is provided with locking teeth 14' and the wall 6w of the extension 6 and/or the steel handle 13 forming its end is also provided with locking protrusions 15' so that on screwing in the cap 12 the locking teeth 14' and the locking protrusions 15' provide a locking seat of the collar 12.2 on extension 6 on motion of the extension 6 in the circumferential direction.

The collar 9.2, 12.2 and the locking teeth 14, 14' are on the connecting ring 9 and the cap 12 and also attain a locking engagement with their locking protrusions 15, 15' as the connecting ring 9 or the cap 12 attains a locking engagement by screwing in the tool handle 3 or the steel handle 13.

The tooth sides 17 of the locking teeth 14, 14' extending in the direction of rotation (arrow 16) corresponding to screwing in the collars 9.2, 12.2 are more gently inclined than the adjacent tooth sides 18 following them so that the locking teeth 14, 14' can be more easily passed by the locking protrusions 15, 15' on screwing in the connecting ring 9 and/or the cap 12 than on unscrewing. The locking teeth 14, 14' extend on an arcuate course like the collars 9.2, 12.2 about the collar axes.

A special radial projecting piece 19 on the outer circumferential surface of the row of teeth 14, 14' apparent in FIG. 6 is provided extending circumferentially from the row of teeth in which the locking teeth 14, 14' follow each other circumferentially to each of the tooth sides 18 following the locking teeth 14, 14' in the direction of rotation corresponding to screwing in the collar. These tooth sides 18 running in the direction of the arrow 16 and the projecting pieces 19 associated with them extend substantially axially and are aligned with each other so that the locking teeth 14, 14' can extend to the locking projections 15, 15' not only axially but also radially for a locking engagement therewith.

To allow the radial and axial locking engagement to be more effective with greater insertion depth of the collar 9.2, 12.2 the locking projections 15, 15' directed in the direction of a greater screwed in depth protrude increasingly further radially.

They attain their full radial height axially over a distance which corresponds substantially to the axial height of the locking teeth 14, 14'.

In this embodiment in which the locking projections 15, 15' are formed by the ends of the ribs 8, this increasing locking depth is attained by a gentle convex curve of the rib ends forming the locking projections 15, 15'. The spacing between the locking teeth 14, 14' following each other in the circumferential direction is substantially equal to the circumferential spacing of the ribs 8 in the passage 5 so that all locking teeth 14, 14' practically simultaneously reach the locking projections 15, 15' for a locking engagement. This results in an especially secure locking seat.

I claim:

1. In a implement such as a gardening tool, cleaning tool or the like comprising a tool handle and an extension insertable slidably and rotatably fitting in a passage of said tool handle, said extension carrying a connecting ring which has one collar insertable into said tool handle and engagable with a wall of said tool handle in a manually rotationally releasable screw connection, the improvement wherein an edge of said collar is provided with a plurality of locking teeth and said wall of said tool handle has a plurality of locking projections inside said passage and on screwing in said collar in said passage said locking teeth and said locking projections come into locking engagement with each other by motion in the circumferential direction about said tool handle so that said collar attains a locking seat in said tool handle.

2. The improvement defined in claim 1 in which the free end of said extension not engagable with said tool handle carries a cap which has another of said collars insertable into said extension which is connected in the same way with a steel sleeve of said extension as said connecting ring with the end of said tool handle, an edge of said other collar of said cap being provided with another plurality of said locking teeth and an interior wall of said extension is provided with another plurality of said locking projections and on screwing in said other collar in said extension said locking teeth and said locking projections come into a locking engagement by motion in said circumferential direction of said extension forming a locking seat of said other collar in said extension.

3. The improvement defined in claim 2 wherein said locking teeth on said connecting ring and cap are substantially identical so that said cap can be brought into a locking engagement with said locking projections of said handle in the same way as said connecting ring on screwing of said cap into said tool handle.

4. The improvement defined in claim 1 wherein the sides of said locking teeth which are leading are inclined more gently than the sides of said locking teeth trailing in a direction of rotation corresponding to screwing in said collar.

5. The improvement defined in claim 4 wherein said locking teeth run arcuately about a collar axis and a radially projecting piece is provided on an outer circumferential surface of said teeth on each of said sides of said locking teeth trailing in said direction of rotation of said collar corresponding to screwing in of said collar, said trailing sides of said teeth and said projecting piece being substantially axially directed and aligned with each other.

6. The improvement defined in claim 1 wherein said locking projections extend increasingly radially into said passage in a direction of greater insertion depth of said collar and the complete radial height of said locking projections is attained over an axial distance which corresponds substantially to the axial height of said locking teeth.

7. The improvement defined in claim 1 further comprising a plurality of ribs extending axially into said passage on said interior wall of said tool handle axially into said passage forming a guide for said extension in said passage, the improvement wherein the ends of said ribs form said locking projections.

8. The improvement defined in claim 7 wherein the spacing of said locking teeth following each other in the circumferentially direction of said collar is equal to the circumferential spacing of said ribs.

9. A implement such as a gardening tool, cleaning tool or the like comprising:
a tool handle having a passage therein;
an extension insertable slidably and rotatably fitting in said passage of said tool handle having a connecting ring which has one collar insertable into said tool handle and engagable with a wall of said tool handle in a manually rotationally releasable screw connection, a plurality of locking teeth being provided on an edge of said collar, said locking teeth being inclined more gently than the sides of said locking teeth trailing said locking teeth in said direction of rotation corresponding to screwing in said collar, and a plurality of locking projections being provided inside said wall of said tool handle so that on screwing said collar in said passage said locking teeth and said locking projections come into locking engagement with each other by motion in the circumferential direction about said tool handle so that said collar attains a locking seat in said tool handle, said locking projections increasing radially into said passage in the direction of greater insertion depth of said collar and the complete radial height of said locking projections being attained over an axial distance which corresponds substantially to the axial height of said locking teeth;

a cap which has another collar provided on the free end of said extension not bearing said tool handle and insertable into said extension which is connected in the same way with a steel sleeve of said extension as said connecting ring with the end of said tool handle, another plurality of said locking teeth provided on an edge of said other collar of said cap, said locking teeth are inclined more gently than the sides of said locking teeth trailing said locking teeth in said direction of rotation corresponding to screwing in said collar, and another plurality of said locking projections being provided on an interior wall of said extension so that on screwing in said other collar in said extension said other plurality of locking teeth and said other plurality of locking projections come into a locking engagement by motion in said circumferential direction of said extension forming a locking seat of said other collar in said extension, said one collar and said other collar and said plurality of locking teeth on said connecting ring and said other plurality of locking teeth on said cap being substantially equal so that said cap attains a locking engagement with said locking projections in the same way as said connecting ring on screwing in said tool handle, a respective radial projecting piece provided on each of said sides of said teeth trailing in said direction of rotation of said collar corresponding to screwing in of said collar, said tooth sides and said projecting piece being substantially axially directed and aligned with each other; and a plurality of ribs extending axially into said passage on said wall of said tool handle axially into said passage forming a guide for said extension in said passage, the ends of said ribs forming said locking projections.

* * * * *